United States Patent
Hood et al.

(10) Patent No.: US 7,904,752 B2
(45) Date of Patent: Mar. 8, 2011

(54) SYNCHRONIZING DEVICE ERROR INFORMATION AMONG NODES

(75) Inventors: James Lamar Hood, Tucson, AZ (US); Brian Anthony Rinaldi, Tucson, AZ (US); Micah Robison, Tucson, AZ (US); Todd Charles Sorenson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 12/132,550

(22) Filed: Jun. 3, 2008

(65) Prior Publication Data
US 2009/0300436 A1 Dec. 3, 2009

(51) Int. Cl.
*G06F 11/00* (2006.01)
(52) U.S. Cl. .................................. 714/16; 714/4; 714/12
(58) Field of Classification Search .................. None
See application file for complete search history.

(56) References Cited

U.S. PATENT DOCUMENTS

| | | | |
|---|---|---|---|
| 6,098,179 A | 8/2000 | Harter, Jr. | |
| 6,510,393 B1 * | 1/2003 | Steinigke | 702/58 |
| 6,701,449 B1 * | 3/2004 | Davis et al. | 714/4 |
| 6,725,281 B1 | 4/2004 | Zintel et al. | |
| 6,728,216 B1 | 4/2004 | Sterner | |
| 6,865,689 B1 * | 3/2005 | Gibson et al. | 714/8 |
| 7,017,071 B2 * | 3/2006 | Katayama et al. | 714/4 |
| 7,092,768 B1 | 8/2006 | Labuda | |
| 7,209,447 B1 | 4/2007 | Marsh et al. | |
| 7,725,774 B2 * | 5/2010 | Ward | 714/43 |
| 2006/0036893 A1 | 2/2006 | Anglin et al. | |
| 2006/0104209 A1 * | 5/2006 | De Araujo et al. | 370/242 |
| 2006/0107088 A1 * | 5/2006 | Katayama et al. | 714/4 |
| 2006/0230306 A1 * | 10/2006 | Richards et al. | 714/7 |
| 2007/0255998 A1 | 11/2007 | Chuang et al. | |

FOREIGN PATENT DOCUMENTS

| | | |
|---|---|---|
| JP | 2003069614 | 3/2003 |
| WO | 96 20547 | 7/1996 |

OTHER PUBLICATIONS

PCT International Search Report and Written Opinion dated Oct. 8, 2009 for PCT Application No. PCT/EP2009/056557 filed May 28, 2009.
Response to PCT International Search Report and Written Opinion dated Dec. 4, 2009 for PCT Application No. PCT/EP2009/056557 filed May 28, 2009.
D.A. Cape, et al., "Model Checking Control Communication of a FACTS Device", IEEE, Computer Society, 2006.

* cited by examiner

*Primary Examiner* — Christopher S McCarthy
(74) *Attorney, Agent, or Firm* — David W. Victor; Konrad Raynes & Victor LLP (57) ABSTRACT

Provided are a method, system, and article of manufacture for synchronizing device error information among nodes. A first node performs an action with respect to a first node error counter for a device in communication with the first node and a second node. The first node transmits a message to the second node indicating the device and the action performed with respect to the first node error counter for the device. The second node performs the action indicated in the message with respect to a second node error counter for the device indicated in the message, wherein the second node error counter corresponds to the first node error counter for the device.

28 Claims, 8 Drawing Sheets

Device Error Information Entry

Device Error Information Entry

FIG. 3

Action Message

FIG. 4

Synchronization Message

SYNCHRONIZING DEVICE ERROR INFORMATION AMONG NODES

BACKGROUND OF THE INVENTION

1. Field of the Invention

The present invention relates to a method, system, and article of manufacture for synchronizing device error information among nodes.

2. Description of the Related Art

Host systems in a storage network may communicate with a storage controller through multiple paths. The storage controller may be comprised of separate storage clusters or nodes, where each storage cluster is capable of accessing the storage and provide redundancy to access the storage. Hosts may access the attached storage through either cluster. If a storage cluster fails, then the host may failover to using the other storage cluster to access the storage.

In redundant storage controller environments, it is common for each storage node or cluster to establish ownership of certain external resources, such as network and Input/Output device adaptors. If a node in the system fails, other nodes in the system can take ownership of the resources that were owned by the failing node. If an external resource in the system starts reporting errors, the owning node will begin thresholding these errors and taking appropriate system recovery actions based on the number of detected errors. If, during this process, the owning node fails, another available node takes ownership of the external resource, but may have no knowledge of the previous errors that were recorded by the failing node. This causes the new owning node to treat the next error on the external resource as if it were the first error.

Further, if the multiple errors reported by the external resource somehow caused the previous owning node to fail, then the new owning node will go through the same actions as the previous node, which could result in the new owning node failing in the same way. If other nodes in the system continue to take ownership of the resource, it could result in all nodes failing, causing the customer to lose access to data. Restarting the recovery operation from a zero error count may cause the overall system recovery (taken by the previous owning node and the new owning node) to take long enough such that the host system times out and the customer loses access to data.

There is a need in the art for improved techniques to maintain error information for shared devices accessed by multiple nodes.

SUMMARY

Provided are a method, system, and article of manufacture for synchronizing device error information among nodes. A first node performs an action with respect to a first node error counter for a device in communication with the first node and a second node. The first node transmits a message to the second node indicating the device and the action performed with respect to the first node error counter for the device. The second node performs the action indicated in the message with respect to a second node error counter for the device indicated in the message, wherein the second node error counter corresponds to the first node error counter for the device.

In a further embodiment, the action indicated in the message comprises an open action. The second node performs the open action by creating the second node error counter for the device in response to the message.

In a further embodiment, the action indicated in the message comprises an expire action. The second node performs the expire action by expiring the second error counter for the device in response to the message.

In a further embodiment, the first node detects an error at the device. The first node performs the action by incrementing the first node error counter for the device in response to detecting the error. The action indicated in the message comprises an increment action. The second node performs the increment action by incrementing the second node error counter for the device at the second node.

In a further embodiment, the first node initiates an error recovery operation in response to the error counter value reaching an error threshold.

In a further embodiment, the first node operates as an owner of the device performing error handling for the device. The second node takes over ownership of the device and increments the second node error counter indicating errors at the device detected by the first node in response to the second node detecting an error at the device.

In a further embodiment, the second node takes over the ownership of the device in response to a failure of the first node.

In a further embodiment, the device comprises a first device, the first node error counter comprises a first node first device error counter, and the second node error counter comprises a second error first device counter copy. The second node maintains a second node second device error counter indicating a number of errors at a second device in communication with the first node and the second node. The first node maintains a first node second device error counter indicating a number of errors at the second device including errors detected by the second node.

In a further embodiment, the first and second nodes comprise first and second processing clusters in a server that communicate over a first interface in the server, wherein the first and second devices comprise first and second network adaptors, and wherein the first and second processing clusters communicate with the first and second adaptors over a second interface.

In a further embodiment, the second node receives an error message from the second device. The second node increments the second node second device error counter. The second node transmits an increment message to the first node for the second device. The first node increments the first node second device error counter to the second error counter value in response to the increment message.

In a further embodiment, the first node operates as an owner of the first device performing error handling for the first device and the second node operates as an owner of the second device performing error handling for the second device. The second node takes over ownership of the first device and uses the second node first device error counter to perform error management for the first device. The first node takes over ownership of the second device and uses the first node second device error counter to perform error management for the second device.

In a further embodiment, a synchronization operation is initiated at the first and second nodes. The first node sends a synchronization message to the second node indicating a value of the first node first device error counter to the second node in response to the synchronization operation. The second node sends a synchronization message to the first node indicating a value of the second node second device error counter to the first node in response to the synchronization operation.

In a further embodiment, the first node updates the first node second device error counter with the value of the second node second device error counter indicated in the synchronization message sent to the first node in response to the first node determining that the value indicated in the synchronization message is greater than the first node second device error counter. The second node updates the second node first device error counter with the value of the first node first device error counter indicated in the synchronization message sent to the second node in response to the second node determining that the value indicated in the synchronization message sent to the second node is greater than the second node first device error counter.

In a further embodiment, the first node generates the first node second device error counter in response to determining that first node does not include the first node second device error counter for the second device. The first node sets the first node second device error counter to the value indicated in the synchronization message sent to the first node. The second node generates the second node first device error counter in response to determining that the second node does not include the second node first device error counter for the first device. The second node sets the second node first device error counter to the value indicated in the synchronization message sent to the second node.

In a further embodiment, the second node initiates a reinitialization operation. The second node sends a join message to the first node as part of the reinitialization operation. The first node sends a message to the second node indicating a value of the first node error counter for the device in response to the join message. The second node updates the second node error counter to the value indicated in the message sent in response to the join message.

DETAILED DESCRIPTION

Figure 1:
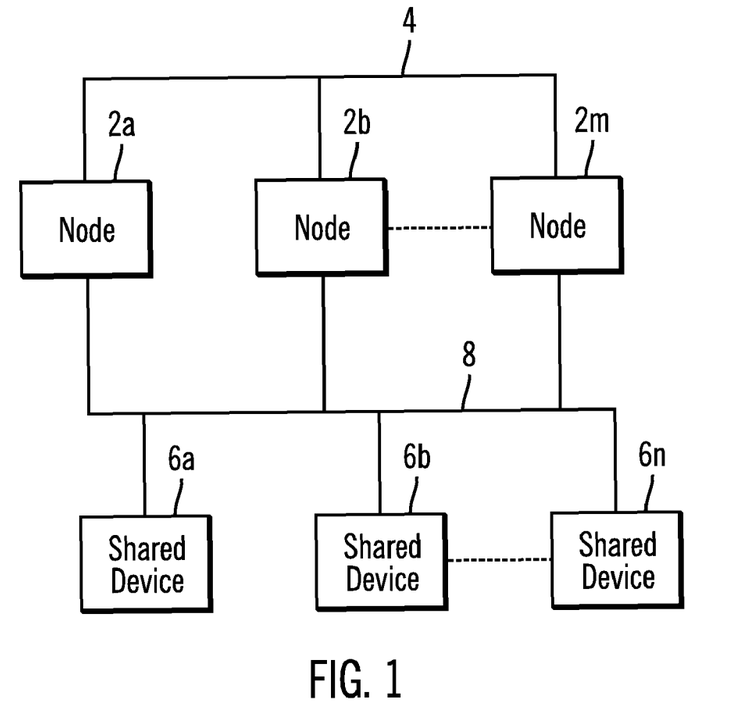
FIG. 1 illustrates an embodiment of a computing environment.

FIG. 1 illustrates an embodiment of a network computing environment. A plurality of computational nodes 2a, 2b . . . 2m communicate with each other over a first interface 4 and the nodes 2a, 2b . . . 2m communicate with shared devices 6a, 6b . . . . 6n over a second interface 8. The nodes 2a, 2b . . . 2m may comprise computational devices that process Input/Output (I/O) requests or perform other operations and commu-nicate with shared devices 6a, 6b . . . 6n. The nodes 2a, 2b . . . 2m may be housed within separate systems or housed in a same computer box or housing. The shared devices 6a, 6b . . . 6n may comprise storage devices, computational resources, e.g., a database, content library, printer, telecommunication device, etc. The first and second interfaces 4 and 8 may each comprise a bus, network, loop, etc. In one embodiment, the first and second interfaces 4 and 8 may not be connected. In an alternative embodiment, the first and second interfaces 4 and 8 may be interconnected by being on the same bus, network, etc., or connected via switches, hubs, bridges, etc. The second interface 8 may comprise a bus, network, loop, etc.

Figure 2:
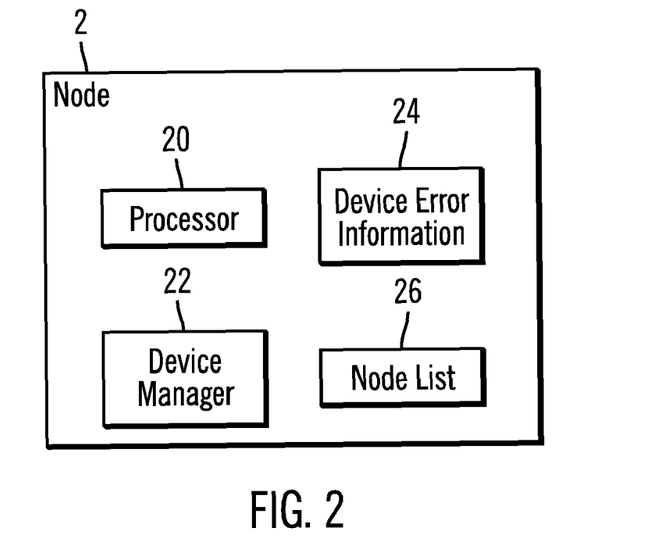
FIG. 2 illustrates an embodiment of node components.

FIG. 2 illustrates an embodiment of components of a node 2, which may comprise the nodes 2a, 2b . . . 2m. The node 2 includes a processor 20 and a device manager 22 to perform management operations with respect to the shared devices 6a, 6b . . . . 6n. The device manager 22 maintains device error information 24 for each of the shared devices 6a, 6b . . . 6n, including devices owned by the node 2 and devices owned by other nodes 2a, 2b . . . 2m. The node list 26 comprises the network address and information on nodes 2a, 2b . . . 2m that access the shared devices 6a, 6b . . . . 6n and be assigned owners of the shared devices 6a, 6b . . . 6n. An owner of a shared device manages access to that shared device 6a, 6b . . . 6n, such that other devices must submit requests to access or use the shared device 6a, 6b . . . 6n to the owning node.

Figure 3:
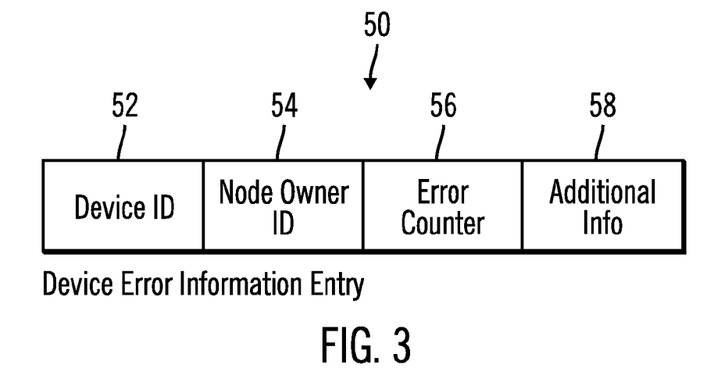
FIG. 3 illustrates an embodiment of device error information.

FIG. 3 illustrates an embodiment of a device error information entry 50, which may comprise an instance or entry of the device error information 24 providing error information for one shared device 6a, 6b . . . 6n. The device error information entry 50 includes a shared device identifier (ID) 52 for which the information is provided; a node owner ID 54 indicating the node 2a, 2b . . . 2m that owns the identified shared device 52; an error counter 56 indicated a number of errors counted for the device 52 by the node owner 54, which may be the node at which the information is maintained or another node 2a, 2b . . . 2m; and additional error information 58, such as counter start time and end time.

Figure 4:
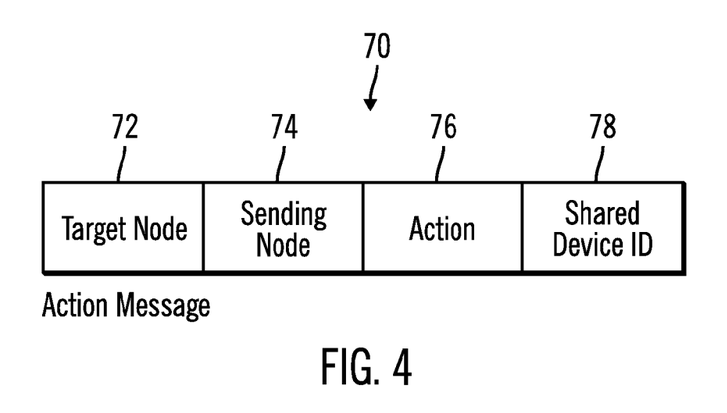
FIG. 4 illustrates an embodiment of an action message.

FIG. 4 illustrates an embodiment of an action message 70 transmitted by an owning node 2a, 2b . . . 2m to the other non-owning nodes 2a, 2b . . . 2m when performing an action with respect to the error counter 56 for the shared device 6a, 6b . . . 6n. The action may comprise opening, expiring or incrementing the error counter 56.

Figure 5:
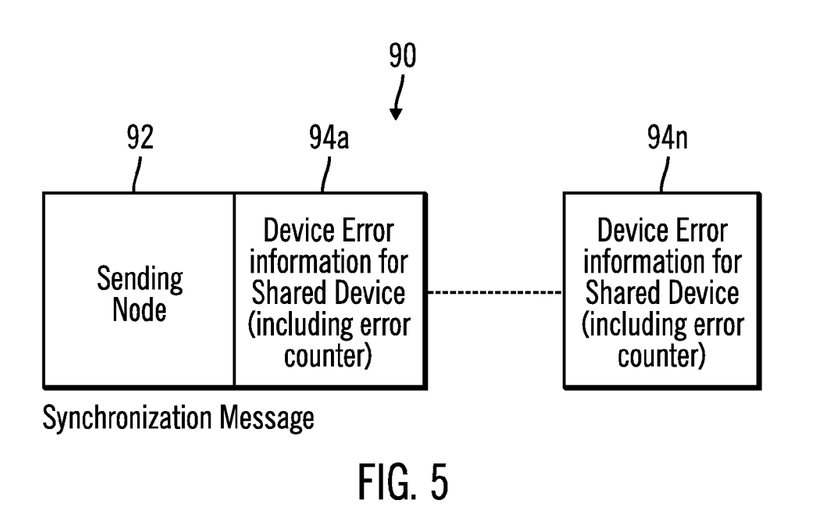
FIG. 5 illustrates an embodiment of a synchronization message.

FIG. 5 illustrates an embodiment of a synchronization message 90 sent by the owning node 2a, 2b . . . 2m when transmitting error information 94a . . . 94n for owned nodes to other non-owning nodes 2a, 2b . . . 2m. The message 90 identifies the sending node 92 and includes device error information 94a . . . 94n, such as the device error information 50 for each shared device 6a, 6b . . . 6n owned by the sending node 92. In a further embodiment, nodes other than the owning node 2a, 2b . . . 2m may send information on device error information.

Figure 6:
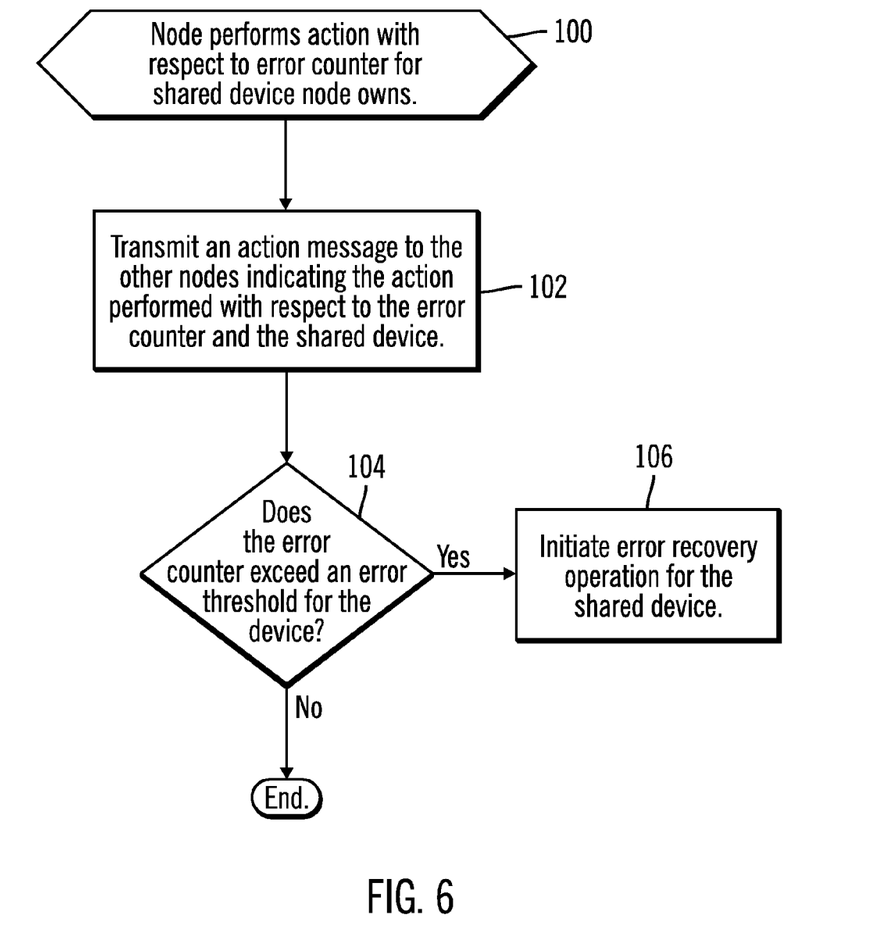
FIG. 6 illustrates an embodiment of node operations to transmit a message for an action performed with respect to an error counter for a device.

FIG. 6 illustrates an embodiment of operations performed by the device manager 22 executing in an owning node 2a, 2b . . . 2m to perform an action with respect to an error counter 56. At block 100, the owning node 2a, 2b . . . 2m performs an action with respect to an error counter 56 for a shared device 6a, 6b . . . 6n the node 2a, 2b . . . 2m owns, such as creating an error counter 56 to monitor a number of errors at the shared device 52, expiring or incrementing the error counter. In response, the owning node 2a, 2b . . . 2m transmits (at block 102) an action message 70 to the other nodes 2a, 2b . . . 2m indicating the action performed with respect to the error counter 56 and the shared device 6a, 6b . . . 6n. The action message 70 may be transmitted to the nodes 2a, 2b . . . 2m indicated in the node list 26. If (at block 104) the error counter 56 exceeds an error threshold for the shared device, then the owning node 2a, 2b . . . 2m initiates (at block 106) an error recovery operation for the shared device 6a, 6b . . . 6n. Otherwise, control ends. When creating a device error information entry 50 to create the error counter 56 for the device 52, the owning node 2a, 2b . . . 2m may indicate additional error counter information, such as a start time the counter was created, current timestamp, end time if the action was to expire the error counter, etc.

Figure 7:
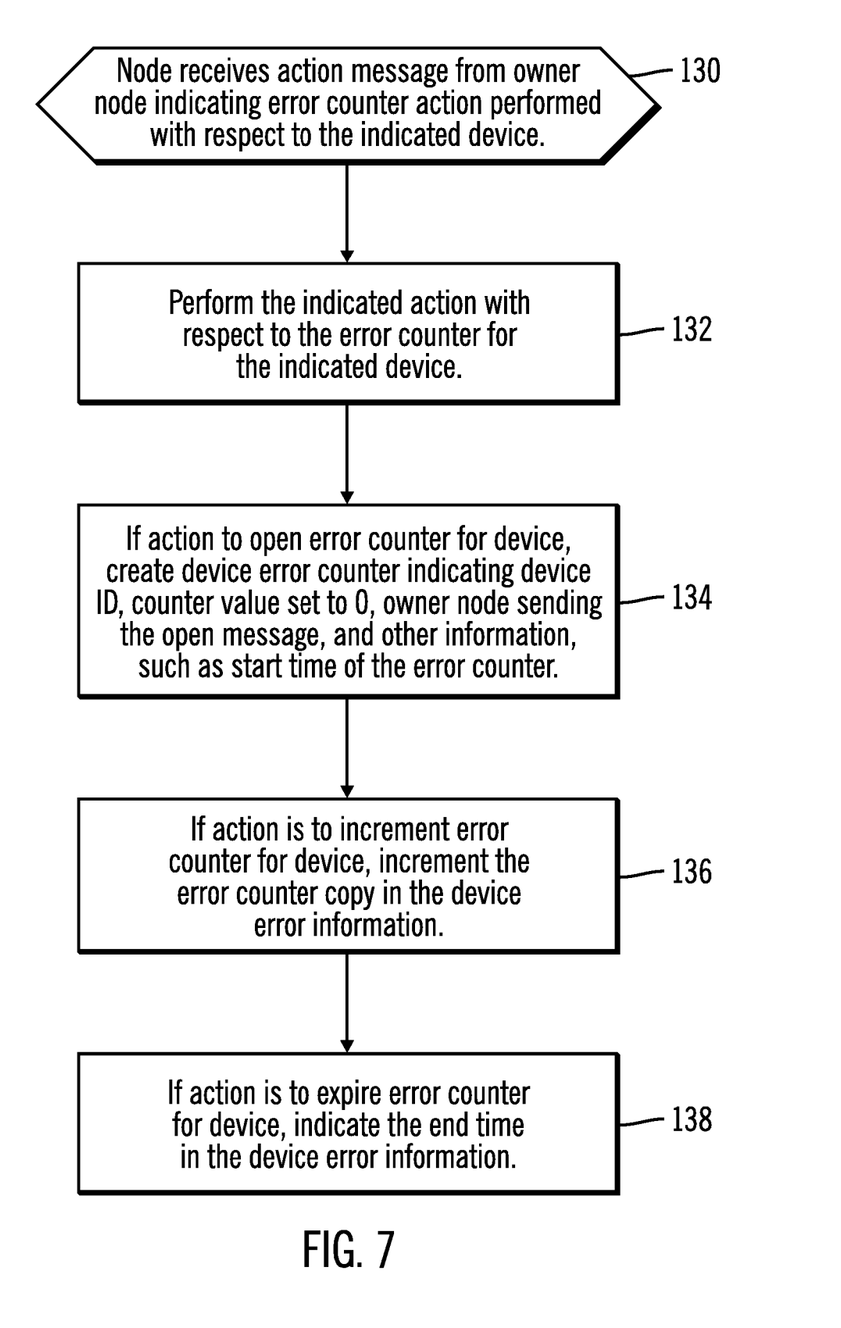
FIG. 7 illustrates an embodiment of node operations to process a message concerning the action performed with respect to the error counter.

FIG. 7 illustrates an embodiment of operations performed by the device manager 22 executing in a node 2a, 2b . . . 2m upon receiving the action message 70. Upon a non-owning node 2a, 2b . . . 2m receiving (at block 130) the action message 70 from the owning node indicating error counter action 76 performed with respect to the indicated device 78, the receiving node 2a, 2b . . . 2m performs the indicated action 76 with respect to the error counter for the indicated device. If (at block 134) the action 76 is to create an error counter 56 for the indicated device 78, device, then the device manager 22 creates a device error counter 56 indicating device ID 52, counter value set to 0, owning node 54 sending the open message, and additional information 58, such as start time of the error counter. If (at block 136) the action 76 is to increment the error counter 56 for the shared device 6a, 6b . . . 6n, then the device manager 22 increments the error counter 56 the receiving node 2a, 2b . . . 2m maintains. If (at block 138) the action 76 is to expire the error counter for the shared device 6a, 6b . . . 6n, then the device manager 22 indicates the end time in the device error information.

Figure 8:
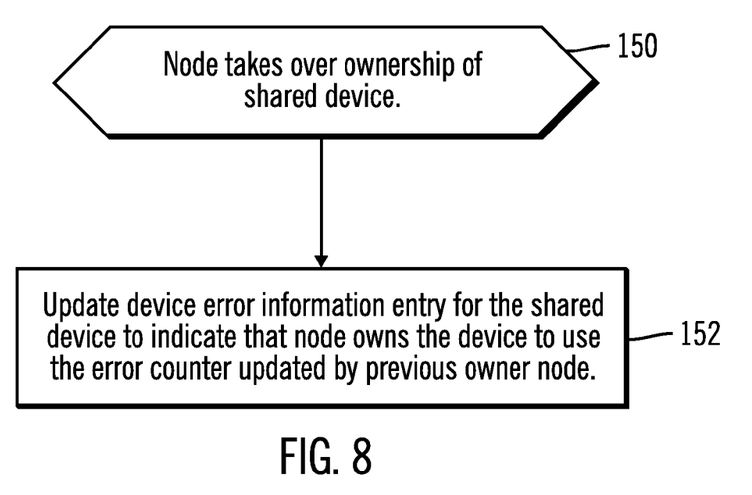
FIG. 8 illustrates an embodiment of node operations to take ownership of a shared device.

FIG. 8 illustrates an embodiment of operations performed by the device manager 22 executing in a node 2a, 2b . . . 2m taking over ownership of a shared device 6a, 6b . . . 6n. In response to taking over ownership (at block 150) of a shared device 6a, 6b . . . 6n the node 2a, 2b . . . 2m did not previously own, the new owning node 2a, 2b . . . 2m updates (at block 152) the device error information entry 50 for the shared device 6a, 6b . . . 6n to indicate that node 2a, 2b . . . 2m now owns the shared device 6a, 6b . . . 6n and uses the error counter 56 including information on updates to the error counter 56 initiated by the previous owning node 2a, 2b . . . 2m. In this way, the new owning node 2a, 2b . . . 2m takes over the error management operations of the previous owning node taking into account the previous errors counted by the previous owning node 2a, 2b . . . 2m.

Figure 9:
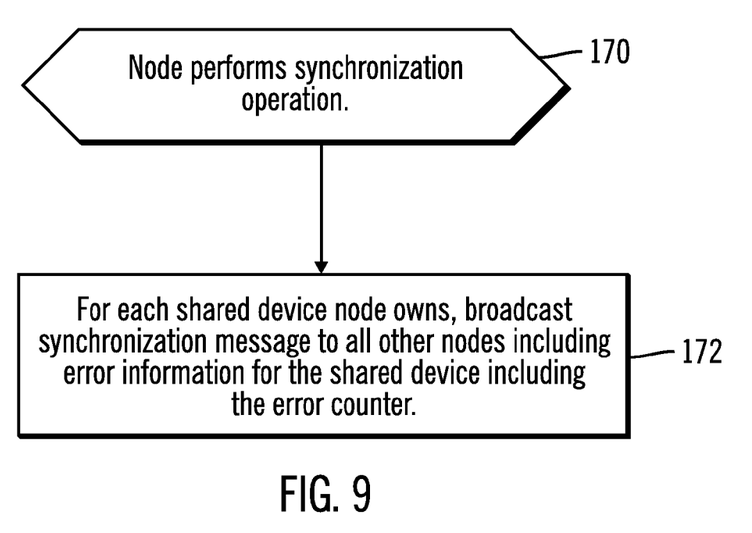
FIG. 9 illustrates an embodiment of node operations to perform a synchronization operation.

FIG. 9 illustrates an embodiment of operations performed by the device manager 22 executing in a node 2a, 2b . . . 2m to perform a synchronization operation. At block 170, the node 2a, 2b . . . 2m performs a synchronization operation. The synchronization operation may be performed periodically or in response to an event, such as some or all of the nodes 2a, 2b . . . 2m rebooting and requesting to rejoin the nodal system. For each shared device 6a, 6b . . . 6m the node 2a, 2b . . . 2m owns, the node 2a, 2b . . . 2m broadcasts (at block 172) a synchronization message 90 to all other nodes 2a, 2b . . . 2m indicating the sending node 92 and device error information 50 for the owned shared devices 6a, 6b . . . 6n including the error counter 56. The device error information 50 for each owned shared device 6a, 6b . . . 6n is included in a separate error information section 94a . . . 94n of the synchronization message 90. The synchronization message 90 may be transmitted to node 2a, 2b . . . 2m in the node list 26.

Figure 10:
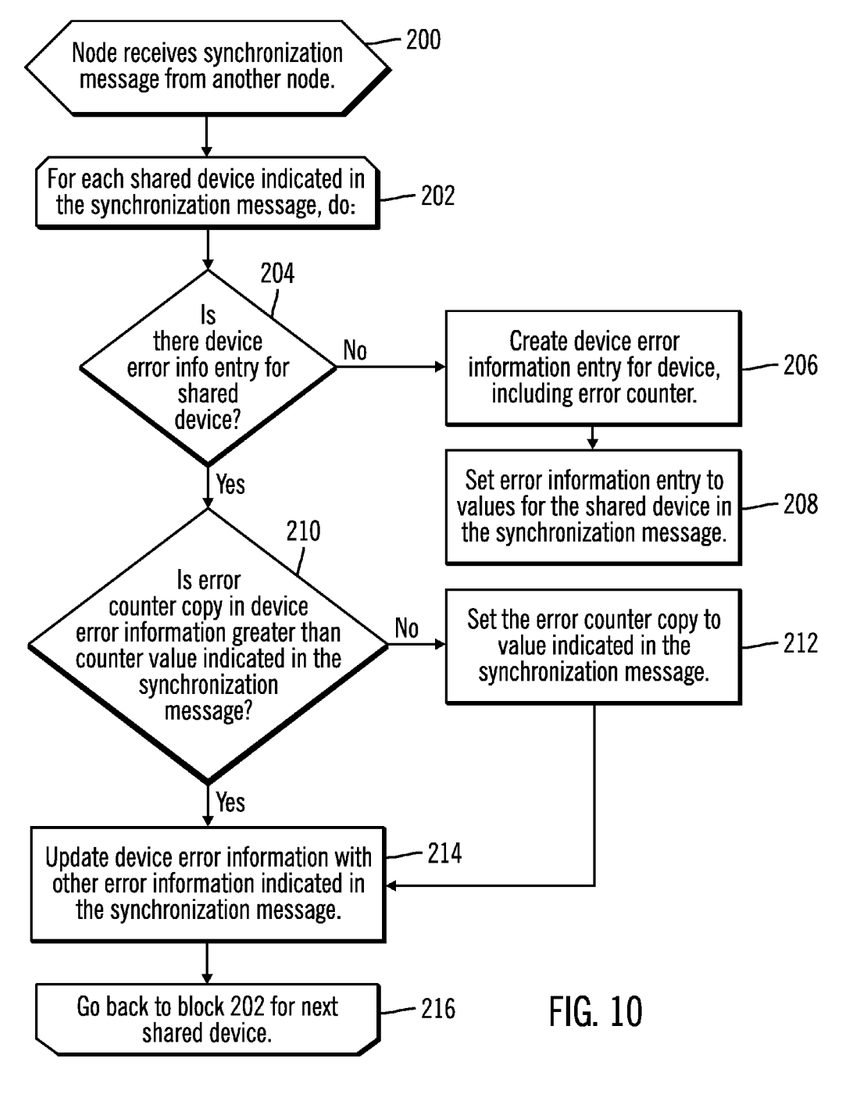
FIG. 10 illustrates an embodiment of node operations to process a received synchronization message.

FIG. 10 illustrates an embodiment of operations performed by the device manager 22 executing in a node 2a, 2b . . . 2m to process a synchronization message 90 from one or more other nodes 2a, 2b . . . 2m. Upon receiving (at block 200) a synchronization message 90, the receiving node 2a, 2b . . . 2m performs the operations at blocks 204 through 214 for each shared device 6a, 6b . . . 6n indicated in the error information 94a . . . 94n in the synchronization message 90. If (at block 204) the node 2a, 2b . . . 2m does not have a device error information entry 50 for the shared device 6a, 6b . . . 6n being considered, then the device manager 22 creates (at block 206) a device error information entry 50 for the shared device 6a, 6b . . . 6n including an error counter 56 to maintain in the local device error information 24. The created device error information entry 50 fields 52, 54, 56, and 58 are set to the values indicated in the synchronization message 90 for the shared device 6a, 6b . . . 6n.

If (at bock 204) there is a local device error information entry 50 for the shared device 6a, 6b . . . 6n and if (at block 210) the error counter 56 in the local device error information 50 is less than the counter value indicated in the synchronization message 90 for the shared device 6a, 6b . . . 6n, then the error counter 56 in the local device error information 50 is set to the error counter value indicated in the synchronization message 90. Otherwise, if (at block 210) the local device error information 50 error counter 56 is greater than the value for the error counter indicated in the synchronization message 90, then the device error information entry 50 is updated (block 214) with information other than the error counter value indicated in the synchronization message 90.

With the operations of FIG. 10, the local copy of the device error information entry 50 being synchronized maintains the largest error counter value 56 between the values currently maintained in the local device error information entry 50 and in the synchronization message 90.

Figure 11:
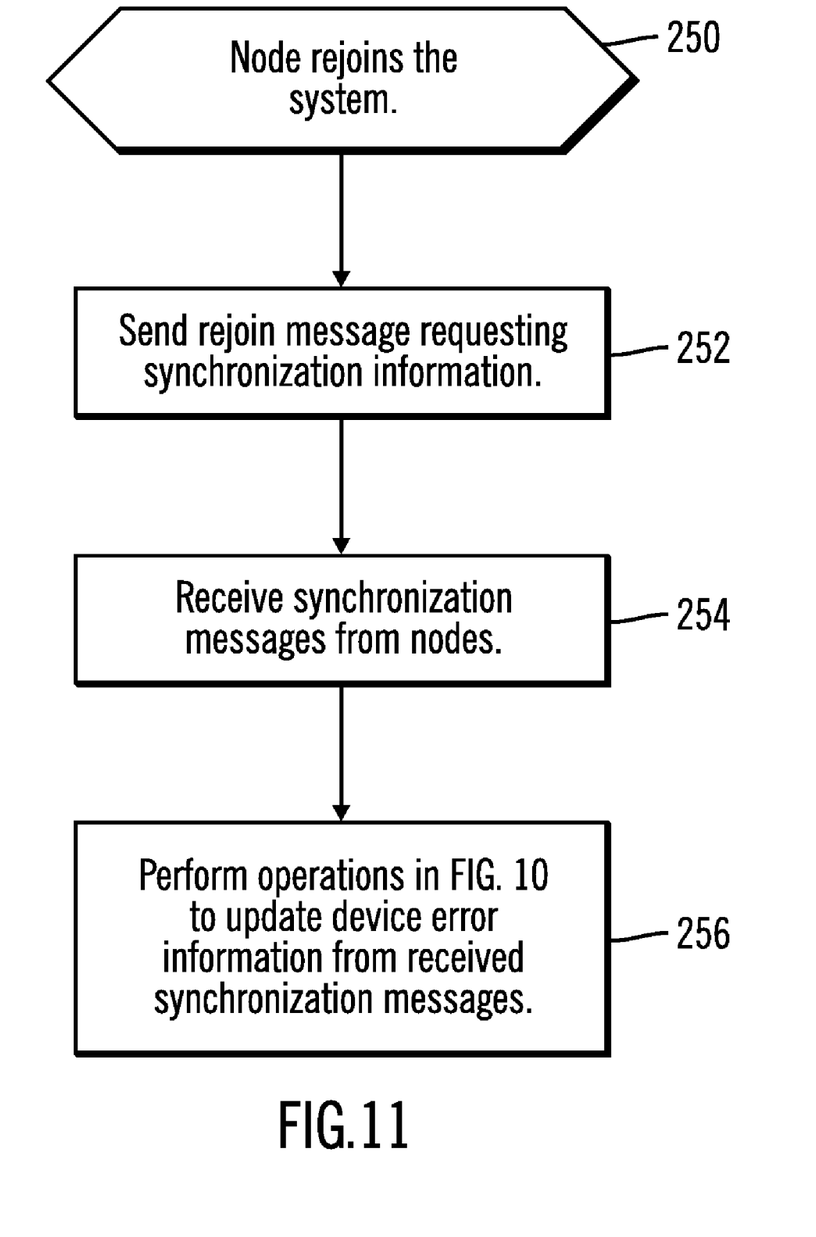
FIG. 11 illustrates an embodiment of node operations to rejoin the system.

FIG. 11 illustrates an embodiment of operations performed by the device manager 22 executing in a node 2a, 2b . . . 2m to rejoin the system after a reboot, such as if the node 2a, 2b . . . 2m is taken offline for error recovery or failure purposes, for a code upgrade, and for other purposes. Upon a node 2a, 2b . . . 2m rejoining (at block 250) the system, the device manager 22 sends (at block 252) a rejoin message to the other node 2a, 2b . . . 2m, indicated in the node list 26, requesting synchronization information so the rejoining node 2a, 2b . . . 2m obtains current device error information 50. Upon receiving (at block 254) synchronization messages 90, the device manager 22 performs (at block 256) the operations in FIG. 10 to update the local device error information 24 from the received synchronization messages 90.

Figure 12:
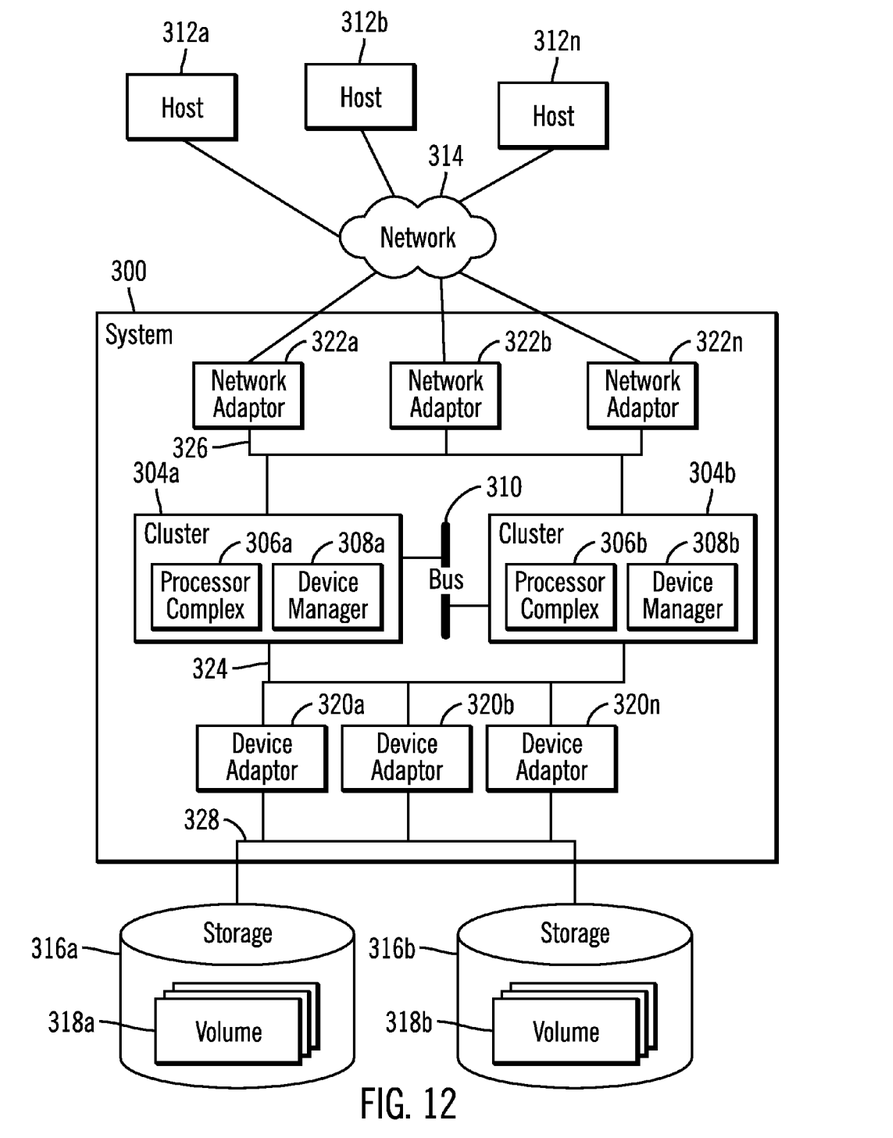
FIG. 12 illustrates an embodiment of a storage server computing environment

FIG. 12 illustrates a storage server 300 embodiment in which the nodes are implemented as clusters 304a and 304b in the server 300. The clusters 304a, 304b each include a processor complex 306a, 306b and a device manager 308a, 308b, which may perform the operations of the device manager 22 described above. The clusters 304a, 304b communicate over a bus 310. The system 300 receives Input/Output (I/O) requests from host systems 312a, 312b . . . 312n over a network 314 directed toward storages 316a, 316b each configured to have one or more volumes 318a, 318b (e.g., Logical Unit Numbers, Logical Devices, etc.). The clusters 304a, 304b may receive I/O requests from the hosts 312a, 312b . . . 312n and buffer the requests and write data in a cache (not shown) to the storage 316a, 316b. The clusters 304a, 304b may have different power boundaries. Each storage cluster 304a, 304b provides access to attached storage 316a, 316b.

In the embodiment of FIG. 12, there are two sets of shared devices, the device adaptors 320a, 320b . . . 320n and network adaptors 322a, 322b . . . 322n. The clusters 304a, 304b communicate with the device adaptors 320a, 320b . . . 320n via interface 324 and the network adaptors 322a, 322b . . . 322n via interface 326. The device adaptors 320a, 320b . . . 320n communicate with the storages 316a, 316b via interface 328. The interfaces 324, 326, and 328 may comprise a bus, such as a Peripheral Interconnect Bus (PCI) or other suitable interface hardware known in the art.

In the embodiment of FIG. 12, the clusters 304a, 304b operate as the above described device managers 308a, 308b and may perform the operations described above with respect to device manager 22 and FIGS. 6-11. The adaptors 320a, 320b . . . 320n and 322a, 322b . . . . 322n may operate as the shared device 306a, 306b . . . 306n, where the clusters 304a, 304b may be designated as owners of specific of the devices 320a, 320b . . . 320n, 322a, 322b . . . . 322n.

The system 302 may comprise a storage controller or server. In an alternative embodiment, the system 302 may comprise different types of computer devices that perform initialization and configuration operations of connected devices. The hosts 314a, 314b . . . 314n may comprise computing devices known in the art, such as a server, mainframe, workstation, personal computer, hand held computer, laptop, telephony device, network appliance, etc. The network 314 may comprise a Storage Area Network (SAN), Local Area Network (LAN), Intranet, the Internet, Wide Area Network (WAN), etc. The storage 8a, 8b may comprise an array of storage devices, such as a Just a Bunch of Disks (JBOD), Direct Access Storage Device (DASD), Redundant Array of Independent Disks (RAID) array, virtualization device, tape storage, flash memory, etc.

Described embodiments provide techniques where a node maintains a local copy of device error information, including an error counter, for shared devices owned by other nodes that is updated when the owning nodes perform actions with respect to their device error information 50, such as update the error counter 56 upon receiving an error message from the shared device 6a, 6b . . . 6n. The device error information is used by a node taking over ownership of another node, such that the node taking over has the current error information used by the node relinquishing the shared device 6a, 6b . . . 6n. In this way, the new owning node may take over error management operations from a current error state at the shared device 6a, 6b . . . 6n as maintained by the previous owning node.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable storage medium", where a processor may read and execute the code from the computer storage readable medium. A computer readable storage medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc.

The transmission signals in which the code or logic is encoded may further comprise a wireless signal, satellite transmission, radio waves, infrared signals, Bluetooth, etc. The "article of manufacture" may comprise a transmitting station and/or a receiving station for transmitting and receiving transmission signals in which the code or logic is encoded, where the code or logic encoded in the transmission signal may be decoded and stored in hardware or a computer readable storage medium at the receiving and transmitting stations or devices. An "article of manufacture" comprises a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The use of variable references, such as "n" or "m", etc., to denote a number of instances of an item may refer to any integer number of instances of the item, where different variables may comprise the same number or different numbers. Further, a same variable reference used with different elements may denote a same or different number of instances of those elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 6, 7, 8, 9, 10, and 11 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
performing, by a first node, an action with respect to a first node error counter for a device in communication with the first node and a second node, wherein the first node operates as an owner of the device performing error handling for the device;
transmitting, by the first node, a message to the second node indicating the device and the action performed with respect to the first node error counter for the device;
performing, by the second node, the action indicated in the message with respect to a second node error counter for the device indicated in the message, wherein the second node error counter corresponds to the first node error counter for the device;
taking over, by the second node, ownership of the device; and
incrementing, by the second node, the second node error counter, indicating errors at the device detected by the first node, in response to the second node detecting an error at the device.

2. The method of claim 1, further comprising:
detecting, by the first node, an error at the device, wherein the action performed by the first node comprises incrementing the first node error counter for the device in response to detecting the error, wherein the action indicated in the message comprises an increment action, wherein performing, by the second node, the increment action comprises incrementing the second node error counter for the device at the second node.

3. The method of claim 1, further comprising:
initiating, by the first node, an error recovery operation in response to the error counter value reaching an error threshold.

4. The method of claim 1, wherein the second node takes over the ownership of the device in response to a failure of the first node.

5. A method, comprising:
performing, by a first node, an open action with respect to a first node error counter for a device in communication with the first node and a second node;
transmitting, by the first node, a message to the second node indicating the device and the open action the first node performed with respect to the first node error counter for the device;
performing, by the second node, the open action indicated in the message by creating a second node error counter for the device in response to the message, wherein the second node error counter corresponds to the first node error counter for the device.

6. A method, comprising:
performing, by a first node, an expire action with respect to a first node error counter for a device in communication with the first node and a second node;
transmitting, by the first node, a message to the second node indicating the device and the expire action performed with respect to the first node error counter for the device; and
performing, by the second node, the expire action by expiring a second node error counter for the device in response to the message, wherein the second node error counter corresponds to the first node error counter for the device.

7. A method, comprising:
performing, by a first node, an action with respect to a first node first device error counter for a first device in communication with the first node and a second node;
transmitting, by the first node, a message to the second node indicating the first device and the action performed with respect to the first node first device error counter for the first device;
performing, by the second node, the action indicated in the message with respect to a second node first device error counter for the first device indicated in the message, wherein the second node first device error counter corresponds to the first node first device error counter for the first device;
maintaining, by the second node, a second node second device error counter indicating a number of errors at a second device in communication with the first node and the second node; and
maintaining, by the first node, a first node second device error counter indicating a number of errors at the second device including errors detected by the second node.

8. The method of claim 7, wherein the first and second nodes comprise first and second processing clusters in a server that communicate over a first interface in the server, wherein the first and second devices comprise first and second network adaptors, and wherein the first and second processing clusters communicate with the first and second adaptors over a second interface.

9. The method of claim 7, further comprising:
receiving, by the second node, an error message from the second device;
incrementing, by the second node, the second node second device error counter;
transmitting, by the second node, an increment message to the first node for the second device;
incrementing, by the first node, the first node second device error counter to the second error counter value in response to the increment message.

10. The method of claim 7, wherein the first node operates as an owner of the first device performing error handling for the first device and wherein the second node operates as an owner of the second device performing error handling for the second device, further comprising:

taking over, by the second node, ownership of the first device, wherein the second node uses the second node first device error counter to perform error management for the first device; and taking over, by the first node, ownership of the second device, wherein the first node uses the first node second device error counter to perform error management for the second device.

11. The method of claim 7, further comprising:

initiating a synchronization operation at the first and second nodes;

sending, by the first node, a synchronization message to the second node indicating a value of the first node first device error counter to the second node in response to the synchronization operation; and sending, by the second node, a synchronization message to the first node indicating a value of the second node second device error counter to the first node in response to the synchronization operation.

12. The method of claim 11, further comprising:

updating, by the first node, the first node second device error counter with the value of the second node second device error counter indicated in the synchronization message sent to the first node in response to the first node determining that the value indicated in the synchronization message is greater than the first node second device error counter; and updating, by the second node, the second node first device error counter with the value of the first node first device error counter indicated in the synchronization message sent to the second node in response to the second node determining that the value indicated in the synchronization message sent to the second node is greater than the second node first device error counter.

13. The method of claim 11, further comprising:

generating, by the first node, the first node second device error counter in response to determining that first node does not include the first node second device error counter for the second device;

setting, by the first node, the first node second device error counter to the value indicated in the synchronization message sent to the first node;

generating, by the second node, the second node first device error counter in response to determining that the second node does not include the second node first device error counter for the first device;

setting, by the second node, the second node first device error counter to the value indicated in the synchronization message sent to the second node.

14. A method, comprising:

performing, by a first node, an action with respect to a first node error counter for a device in communication with the first node and a second node;

transmitting, by the first node, a message to the second node indicating the device and the action performed with respect to the first node error counter for the device;

performing, by the second node, the action indicated in the message with respect to a second node error counter for the device indicated in the message, wherein the second node error counter corresponds to the first node error counter for the device;

initiating, by the second node, a reinitialization operation;

sending, by the second node, a join message to the first node as part of the reinitialization operation;

sending, by the first node, a message to the second node indicating a value of the first node error counter for the device in response to the join message; and updating, by the second node, the second node error counter to the value indicated in the message sent in response to the join message.

15. A system in communication with a device, comprising:

a first node; and a second node, wherein the first node executes code to perform operations, the operations comprising:

performing an action with respect to a first node error counter for the device in communication with the first node and the second node, wherein the first node operates as an owner of the device performing error handling for the device;

transmitting a message to the second node indicating the device and the action performed with respect to the first node error counter for the device; and wherein the second node executes code to perform operations, the operations comprising:

performing the action indicated in the message with respect to a second node error counter for the device indicated in the message, wherein the second node error counter corresponds to the first node error counter for the device;

taking over ownership of the device; and incrementing the second node error counter, indicating errors at the device detected by the first node, in response to the second node detecting an error at the device.

16. The system of claim 15, wherein the first node further detects an error at the device, wherein the action performed by the first node comprises incrementing the first node error counter for the device in response to detecting the error, wherein the action indicated in the message comprises an increment action, wherein performing, by the second node, the increment action comprises incrementing the second node error counter for the device at the second node.

17. A system in communication with a first device and a second device, comprising:

a first node; and a second node, wherein the first node executes code to perform operations, the operations comprising:

performing an action with respect to a first node first device error counter for the first device in communication with the first node and the second node;

transmitting a message to the second node indicating the first device and the action performed with respect to the first node first device error counter for the first device; and maintains maintaining a first node second device error counter indicating a number of errors at the second device including errors detected by the second node; and wherein the second node executes code to perform operations, the operations comprising:

performing the action indicated in the message with respect to a second node first device error counter for the first device indicated in the message, wherein the second node first device error counter corresponds to the first node first device error counter for the first device; and maintaining a second node second device error counter indicating a number of errors at the second device in communication with the first node and the second node.

18. The system of claim 17, wherein the first node operates as an owner of the first device performing error handling for the first device and wherein the second node operates as an owner of the second device performing error handling for the second device, wherein the second node further takes over ownership of the first device, wherein the second node uses the second node first device error counter to perform error management for the first device; and wherein the first node further takes over ownership of the second device, wherein the first node uses the first node second device error counter to perform error management for the second device.

19. An article of manufacture comprising a computer readable storage medium including code executed by a first node and a second node, wherein a device is in communication with the first node and the second node, wherein the code is executed to cause operations, the operations comprising:

performing, by the first node, an action with respect to a first node error counter for the device, wherein the first node operates as an owner of the device performing error handling for the device;

transmitting, by the first node, a message to the second node indicating the device and the action performed with respect to the first node error counter for the device;

performing, by the second node, the action indicated in the message with respect to a second node error counter for the device indicated in the message, wherein the second node error counter corresponds to the first node error counter for the device;

taking over, by the second node, ownership of the device; and incrementing, by the second node, the second node error counter, indicating errors at the device detected by the first node, in response to the second node detecting an error at the device.

20. The article of manufacture of claim 19, wherein the operations further comprise:

detecting, by the first node, an error at the device, wherein the action performed by the first node comprises incrementing the first node error counter for the device in response to detecting the error, wherein the action indicated in the message comprises an increment action, wherein performing, by the second node, the increment action comprises incrementing the second node error counter for the device at the second node.

21. An article of manufacture comprising a computer readable storage medium including code executed by a first node and a second node, wherein a first device and a second device are in communication with the first node and the second node, wherein the code is executed to cause operations, the operations comprising:

performing, by the first node, an action with respect to a first node first device error counter for the first device;

transmitting, by the first node, a message to the second node indicating the first device and the action performed with respect to the first node first device error counter for the first device;

performing, by the second node, the action indicated in the message with respect to a second node first error counter for the first device indicated in the message, wherein the second node first device error counter corresponds to the first node first device error counter for the first device;

maintaining, by the second node, a second node second device error counter indicating a number of errors at the second device in communication with the first node and the second node; and maintaining, by the first node, a first node second device error counter indicating a number of errors at the second device including errors detected by the second node.

22. The article of manufacture of claim 21, wherein the first node operates as an owner of the first device performing error handling for the first device and wherein the second node operates as an owner of the second device performing error handling for the second device, wherein the operations further comprise:

taking over, by the second node, ownership of the first device, wherein the second node uses the second node first device error counter to perform error management for the first device; and taking over, by the first node, ownership of the second device, wherein the first node uses the first node second device error counter to perform error management for the second device.

23. A system in communication with a device, comprising:
   a first node; and
   a second node,
   wherein the first node executes code to perform operations, the operations comprising:
      performing an open action with respect to a first node error counter for the device in communication with the first node and the second node;
      transmitting a message to the second node indicating the device and the open action performed with respect to the first node error counter for the device; and
   wherein the second node executes code to perform the open action indicated in the message by creating a second node error counter for the device in response to the message, wherein the second node error counter corresponds to the first node error counter for the device.

24. A system in communication with a device, comprising:
   a first node; and
   a second node,
   wherein the first node executes code to perform operations, the operations comprising:
      performing an expire action with respect to a first node error counter for the device in communication with the first node and the second node;
      transmitting a message to the second node indicating the device and the expire action performed with respect to the first node error counter for the device; and
   wherein the second node executes code to perform the expire action by expiring a second node error counter for the device in response to the message, wherein the second node error counter corresponds to the first node error counter for the device.

25. A system in communication with a device, comprising:
   a first node; and
   a second node,
   wherein the first node executes code and the second node executes code to perform operations, the operations comprising:
      performing, by the first node, an action with respect to a first node error counter for the device in communication with the first node and the second node;
      transmitting, by the first node, a message to the second node indicating the device and the action performed with respect to the first node error counter for the device;
      performing, by the second node, the action indicated in the message with respect to a second node error counter for the device indicated in the message, wherein the second node error counter corresponds to the first node error counter for the device;

initiating, by the second node, a reinitialization operation;
sending, by the second node, a join message to the first node as part of the reinitialization operation;
sending, by the first node, a message to the second node indicating a value of the first node error counter for the device in response to the join message; and
updating, by the second node, the second node error counter to the value indicated in the message sent in response to the join message.

26. An article of manufacture comprising a computer readable storage medium including code executed by a first node and a second node, wherein a device is in communication with the first node and the second node, wherein the code is executed to cause operations, the operations comprising:
performing, by the first node, an open action with respect to a first node error counter for the device;
transmitting, by the first node, a message to the second node indicating the device and the open action performed with respect to the first node error counter for the device;
performing, by the second node, the open action indicated in the message by creating a second node error counter for the device in response to the message, wherein the second node error counter corresponds to the first node error counter for the device.

27. An article of manufacture comprising a computer readable storage medium including code executed by a first node and a second node, wherein a device is in communication with the first node and the second node, wherein the code is executed to cause operations, the operations comprising:
performing an expire action with respect to a first node error counter for the device in communication with the first node and the second node;
transmitting a message to the second node indicating the device and the expire action performed with respect to the first node error counter for the device; and
performing, by the second node, the expire action by expiring a second node error counter for the device in response to the message, wherein the second node error counter corresponds to the first node error counter for the device.

28. An article of manufacture comprising a computer readable storage medium including code executed by a first node and a second node, wherein a device is in communication with the first node and the second node, wherein the code is executed to cause operations, the operations comprising:
performing, by the first node, an action with respect to a first node error counter for the device in communication with the first node and the second node;
transmitting, by the first node, a message to the second node indicating the device and the action performed with respect to the first node error counter for the device;
performing, by the second node, the action indicated in the message with respect to a second node error counter for the device indicated in the message, wherein the second node error counter corresponds to the first node error counter for the device;
initiating, by the second node, a reinitialization operation;
sending, by the second node, a join message to the first node as part of the reinitialization operation;
sending, by the first node, a message to the second node indicating a value of the first node error counter for the device in response to the join message; and
updating, by the second node, the second node error counter to the value indicated in the message sent in response to the join message.

* * * * *